(12) United States Patent
Kawakami et al.

(10) Patent No.: US 11,417,911 B2
(45) Date of Patent: Aug. 16, 2022

(54) ALL-SOLID-STATE BATTERY AND METHOD FOR PRODUCING THE SAME

(71) Applicant: TOYOTA JIDOSHA KABUSHIKI KAISHA, Toyota (JP)

(72) Inventors: Masatsugu Kawakami, Sunto-gun (JP); Yasumasa Oguma, Sunto-gun (JP); Hiroshi Tsuno, Gotemba (JP); Hiroaki Nishino, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 477 days.

(21) Appl. No.: 16/703,508

(22) Filed: Dec. 4, 2019

(65) Prior Publication Data

US 2020/0185779 A1   Jun. 11, 2020

(30) Foreign Application Priority Data

Dec. 5, 2018   (JP) .............................. JP2018-228056

(51) Int. Cl.
*H01M 10/0585* (2010.01)
*H01M 10/0525* (2010.01)
*H01M 50/124* (2021.01)
*H01M 50/531* (2021.01)

(52) U.S. Cl.
CPC ... *H01M 10/0585* (2013.01); *H01M 10/0525* (2013.01); *H01M 50/124* (2021.01); *H01M 50/531* (2021.01)

(58) Field of Classification Search
CPC ......... H01M 10/0585; H01M 10/0525; H01M 50/124; H01M 50/531
See application file for complete search history.

(56) References Cited

U.S. PATENT DOCUMENTS

2015/0171382 A1   6/2015   Suh et al.
2018/0233711 A1   8/2018   Kato

FOREIGN PATENT DOCUMENTS

| JP | 2000-90975 A | 3/2000 |
| JP | 2000-100396 A | 4/2000 |
| JP | 2001-118547 A | 4/2001 |
| JP | 2007-200589 A | 8/2007 |
| JP | 2012-084247 A | 4/2012 |
| JP | 2015-118938 A | 6/2015 |
| JP | 2016-139494 A | 8/2016 |
| JP | 2018-133175 A | 8/2018 |

*Primary Examiner* — Osei K Amponsah
(74) *Attorney, Agent, or Firm* — Sughrue Mion, PLLC

(57) ABSTRACT

The invention provides a laminated all-solid-state battery that can increase volumetric energy density and maintain the shape of the all-solid-state battery, as well as a method for producing the laminated all-solid-state battery. The all-solid-state battery comprises a battery stack having two or more unit cells and an exterior film sealing the battery stack, wherein the battery stack has a hexahedron shape formed by a top surface and bottom surface in the stacking direction and first, second, third and fourth side walls, the exterior film is a single film covering the battery stack from the top surface and bottom surface in a manner covering the fourth side wall, and condition (i) is satisfied when collector tabs protrude from the first or third side wall or condition (ii) is satisfied when collector tabs protrude from the second side wall, as well as a method for producing the all-solid-state battery.

10 Claims, 10 Drawing Sheets

ALL-SOLID-STATE BATTERY AND METHOD FOR PRODUCING THE SAME

FIELD

The present disclosure relates to an all-solid-state battery comprising a battery stack and an exterior film that seals the battery stack, and to a method for producing the same.

BACKGROUND

In recent years, all-solid-state batteries have been proposed as power sources for portable devices, automobiles and the like. It is usually proposed for such all-solid-state batteries to be used as all-solid-state batteries that are constructed of a battery stack and an exterior material sealing the battery stack.

PTL 1, for example, discloses a laminated cell with a laminate exterior body comprising a cell element housing section, housing a cell element that has a positive electrode tab and a negative electrode tab leading out from the top, and a sealing section for sealing of the cell element housing section. The laminate exterior body is characterized by being provided with a fold-over section provided on a sealing section at a side wall of the cell element housing section, being provided with a notch at the fold-over section near the base, on the outer side from the fold-over line, and having a fold-over section that is folded over to the inner side across the entire side wall, after the corner of the base has been folded over upward to the inner side along the notch.

PTL 2 discloses a battery comprising a battery cell and a container housing the battery cell. The container is equipped with a bottom cover having openings provided on the bottom surface, on side walls standing from the bottom surface and on the top surface side, and a top cover having openings provided on the top surface, on side walls standing from the top surface and on the bottom surface side, with the side walls of the bottom cover and the side walls of the top cover overlapping each other. It is also characterized in that the terminals connected to the battery cell housed in the container are fixed to members that are to compose the side walls of the container.

PTL 3 discloses a flexible secondary battery that includes an electrode assembly, and an exterior material with one or more joints, sealing the electrode assembly. It is characterized in that the joints extend in the lengthwise direction of the electrode assembly, from a location overlapping with the electrode assembly.

PTL 4 discloses a laminated battery having a laminate member with overlaid first and second films, and a battery cell housed between the first and second films. The perimeter sections of the laminate member have outer edge sections where the first and second films are bonded, and inner edge sections where the first and second films are not bonded. This battery is also characterized in that the outer edge sections are folded at least once along the side walls of the battery cell, and the inner edge sections are folded at least once along the side walls of the battery cell.

PTL 5 discloses a method for producing a laminated all-solid-state battery that includes housing an all-solid-state battery stack inside an exterior body made of a laminate film, pressing the all-solid-state battery stack housed in the exterior body in the stacking direction, from the outer side of the exterior body, injecting a filler into the exterior body while still pressing, and sealing the exterior body, as well as a laminated all-solid-state battery having such a construction.

PTL 6 discloses a technique of sealing not an all-solid-state battery but rather a secondary battery that employs an electrolyte solution, in a gusseted bag. More specifically, the secondary battery of Reference 6 is characterized by having a bag for housing an electrolyte solution, composed of a protective layer, a water vapor-impermeable layer, an electrical insulation layer and an adhesive layer from the outer side, and tapered metal terminals inserted in the adhesive layer and welded to openings in the bag, wherein the adhesive layer is made of a polyolefin-based resin with a polar group.

CITATION LIST

Patent Literature

[PTL 1] Japanese Unexamined Patent Publication No. 2007-200589
[PTL 2] Japanese Unexamined Patent Publication No. 2012-084247
[PTL 3] Japanese Unexamined Patent Publication No. 2015-118938
[PTL 4] Japanese Unexamined Patent Publication No. 2016-139494
[PTL 5] Japanese Unexamined Patent Publication No. 2018-133175
[PTL 6] Japanese Unexamined Patent Publication No. 2000-100396

SUMMARY

Technical Problem

In an all-solid-state battery having a construction sealed with an exterior material as described above, it is desirable to decrease the bulk of the exterior material and improve the volumetric efficiency of the all-solid-state battery.

Means have been proposed to reduce the bulk of the exterior material in a conventional laminated battery, including folding the perimeter edge parts of the exterior material, or further using tape to anchor the folded perimeter edge parts to the battery stack side.

As a more specific example, FIG. 2 shows means in which the joined perimeter edge parts 21a of an aluminum laminate exterior body 21 sealing a battery stack 20 are folded, thus reducing the bulk of the exterior material (left in FIG. 2). Another means for reducing the bulk of an exterior material is to use tape 22 to anchor the joined perimeter edge parts 21a to the battery stack 20 side (right in FIG. 2).

In a conventional laminated battery, however, the perimeter edge parts 21a are shaped as flanges in order to house the battery stack 20 in an aluminum laminate 21, as shown at left in FIG. 2, for example, thereby forming a cup shape in the aluminum laminate 21 beforehand by embossing or the like. Therefore, a large space 25a is produced between the perimeter edge parts 21a and the side wall edge parts of the battery stack 20. Even when the joined perimeter edge parts 21a are folded, the rounded portions (R portions) of the cup-shaped corners constitute a hindrance against reducing the space 25a. It is therefore not easy to reduce the bulk of the exterior material. Moreover, due to the space 25a that is present when perimeter edge parts 21a joined in this manner are folded, it has been very difficult to maintain the shape of the exterior material, i.e. the shape of the laminated battery.

With tape anchoring as shown at right in FIG. 2 it is possible to somewhat reduce the space 25a between the joined perimeter edge parts 21a and the side wall edges of the battery stack 20. However, the means used for such tape anchoring is often difficult to apply in an all-solid-state battery which requires the battery stack to be constrained.

The present disclosure has been devised in light of these circumstances, and its object is to provide an all-solid-state battery and a method for producing the same, that allow volumetric energy density increase and shape maintenance to be achieved.

Solution to Problem

The present inventors have found that the aforementioned problem can be solved by the following technical means.
<Aspect 1>
An all-solid-state battery comprising a battery stack with two or more unit cells, and an exterior film that seals the battery stack, wherein:

each unit cell is composed of a positive electrode collector layer, a positive electrode active material layer, a solid electrolyte layer, a negative electrode active material layer and a negative electrode collector layer, stacked in that order, the battery stack has a hexahedron shape formed by a top surface and bottom surface in the stacking direction, and first, second, third and fourth side walls, the first, second, third and fourth side walls being adjacent in that order, collector tabs of the battery stack protrude out from the first, second or third side wall, the exterior film is a single film covering the fourth side wall and sandwiching the battery stack from the top surface, and the bottom surface, the exterior film has:

first and second main side covering parts respectively covering the top surface and bottom surface of the battery stack, and mutually facing first, second and third perimeter edge parts respectively on the first, second and third side walls of the battery stack, first boundary parts between the first perimeter edge parts and the second perimeter edge parts, second boundary parts between the second perimeter edge parts and the third perimeter edge parts, a third boundary part between the third perimeter edge parts and a part covering the fourth side wall of the battery stack, and a fourth boundary part between the part covering the fourth side wall of the battery stack, and the first perimeter edge parts, with the collector tabs satisfying the following condition (i) when the collector tabs protrude from the first or third side wall, and the collector tabs satisfying the following condition (ii) when the collector tabs protrude from the second side wall:

condition (i)

the first boundary parts are folded from the boundary line between the first side wall and the second side wall along the first side wall, and between the facing first perimeter edge parts, the second boundary parts are folded from the boundary line between the second side wall and the third side wall along the third side wall, and between the facing third perimeter edge parts, the third boundary part is folded from the boundary line between the third side wall and the fourth side wall along the third side wall, and between the facing third perimeter edge parts, the fourth boundary part is folded from the boundary line between the fourth side wall and the first side wall along the first side wall, and between the facing first perimeter edge parts, the facing first, second and third perimeter edge parts are joined together so that the battery stack is sealed by the exterior film, the collector tabs protrude out from between the mutually facing and mutually joined first or third perimeter edge parts, and the mutually joined second perimeter edge parts are folded along the second side wall;

condition (ii)

the first boundary parts are folded from the boundary line between the first side wall and the second side wall along the second side wall, and between the facing second perimeter edge parts, the second boundary parts are folded from the boundary line between the second side wall and the third side wall along the second side wall, and between the facing second perimeter edge parts, the third boundary part is folded from the boundary line between the third side wall and the fourth side wall along the third side wall, and between the facing third perimeter edge parts, the fourth boundary part is folded from the boundary line between the fourth side wall and the first side wall along the first side wall, and between the facing first perimeter edge parts, the facing first, second and third perimeter edge parts are joined together so that the battery stack is sealed by the exterior film, the collector tabs protrude out from between the mutually facing and mutually joined second perimeter edge parts, and the mutually joined first and third perimeter edge parts are folded along the first and third side walls, respectively.
<Aspect 2>
The all-solid-state battery according to aspect 1, wherein for condition (i), when the collector tabs protrude from the first perimeter edge parts, the mutually joined third perimeter edge parts are folded along the third side wall, and when the collector tabs protrude from the third perimeter edge parts, the mutually joined first perimeter edge parts are folded along the first side wall.
<Aspect 3>
The all-solid-state battery according to aspect 1 or 2, wherein at the perimeter edge parts among the mutually joined first, second and third perimeter edge parts that are folded along the first, second and third side walls, the folding widths along the first, second and third side walls are no greater than the thickness in the stacking direction of the battery stack.
<Aspect 4>
The all-solid-state battery according to any one of aspects 1 to 3, wherein the mutually joined first, second and third perimeter edge parts do not protrude outward from the battery stack in the stacking direction of the battery stack.
<Aspect 5>
The all-solid-state battery according to any one of aspects 1 to 4, wherein at least one of the respective joining sites of the mutually joined first, second and third perimeter edge parts extends from a location between the top surface and bottom surface in the stacking direction of the battery stack.
<Aspect 6>
The all-solid-state battery according to any one of aspects 1 to 5, wherein at least one of the respective joining sites of the mutually joined first, second, third and fourth perimeter edge parts extends from a location at the top surface or the bottom surface in the stacking direction of the battery stack.
<Aspect 7>

The all-solid-state battery according to any one of aspects 1 to 6, wherein the battery stack has a rectangular solid shape, and the respective areas of the top surface and bottom surface are larger than the areas of all of the first, second, third and fourth side walls.
<Aspect 8>

The all-solid-state battery according to any one of aspects 1 to 7, wherein the exterior film is an aluminum laminate film.
<Aspect 9>

A method for producing the all-solid-state battery according to any one of aspects 1 to 8 in which the collector tabs protrude from the first or third side wall, the method including the following steps:

(a) covering the battery stack by the exterior film from the top surface and bottom surface, and covering the fourth side wall, so that the first, second and third perimeter edge parts of the exterior film and the first and second boundary parts are each mutually facing;

(b) joining together the facing second perimeter edge parts, first boundary parts and second boundary parts;

(c) folding the mutually joined second perimeter edge parts, first boundary parts and second boundary parts along the second side wall of the battery stack;

(d) carrying out the following steps (d-1) to (d-4) either simultaneously or in an arbitrary order:

(d-1) folding the first boundary parts of the exterior film from the boundary line between the first side wall and second side wall, along the first side wall and between the facing first perimeter edge parts, (d-2) folding the second boundary parts of the exterior film from the boundary line between the second side wall and the third side wall, along the third side wall and between the facing third perimeter edge parts, (d-3) folding the third boundary part of the exterior film from the boundary line between the third side wall and the fourth side wall, along the third side wall and between the facing third perimeter edge parts, and (d-4) folding the fourth boundary part of the exterior film from the boundary line between the fourth side wall and the first side wall, along the first side wall and between the facing first perimeter edge parts; and (e) joining together the facing first or third perimeter edge parts together with the boundary parts respectively folded between them, with the collector tabs protruding from between the facing first or third perimeter edge parts.
<Aspect 10>

A method for producing the all-solid-state battery according to any one of aspects 1 to 8 in which the collector tabs protrude from the second side wall, the method including the following steps:

(a) covering the battery stack by the exterior film from the top surface and bottom surface, and covering the fourth side wall, so that the first, second and third perimeter edge parts of the exterior film and the first and second boundary parts are each mutually facing;

(b) carrying out the following steps (b-1) and (b-2) either simultaneously or in an arbitrary order:

(b-1) folding the third boundary part of the exterior film from the boundary line between the third side wall and the fourth side wall, along the third side wall and between the facing third perimeter edge parts, and (b-2) folding the fourth boundary part of the exterior film from the boundary line between the fourth side wall and the first side wall, along the first side wall and between the facing first perimeter edge parts;

(c) joining together the facing first perimeter edge parts and the fourth boundary part folded between them, the facing third perimeter edge parts and the third boundary part folded between them, and the facing first and second boundary parts;

(d) carrying out the following steps (d-1) and (d-2) either simultaneously or in an arbitrary order:

(d-1) folding the mutually joined first perimeter edge parts, the mutually joined first boundary parts and the fourth boundary part folded between the facing first perimeter edge parts, along the first side wall of the battery stack, and (d-2) folding the mutually joined third perimeter edge parts, the mutually joined second boundary parts and the third boundary part folded between the facing third perimeter edge parts, along the third side wall of the battery stack;

(e) carrying out the following steps (e-1) and (e-2) either simultaneously or in an arbitrary order:

(e-1) folding the first boundary parts of the exterior film from the boundary line between the first side wall and the second side wall, along the second side wall and between the facing second perimeter edge parts, and (e-2) folding the second boundary parts of the exterior film from the boundary line between the third side wall and the third side wall, along the second side wall and between the facing second perimeter edge parts; and (f) joining together the facing second perimeter edge parts together with the boundary parts respectively folded between them, with the collector tabs protruding from between the facing second perimeter edge parts.

Advantageous Effects of Invention

With the all-solid-state battery and the method for producing the all-solid-state battery of the present disclosure, it is possible to increase the volumetric energy density of an all-solid-state battery. It is also possible to maintain the shape of the all-solid-state battery.

DESCRIPTION OF EMBODIMENTS

Figure 1:
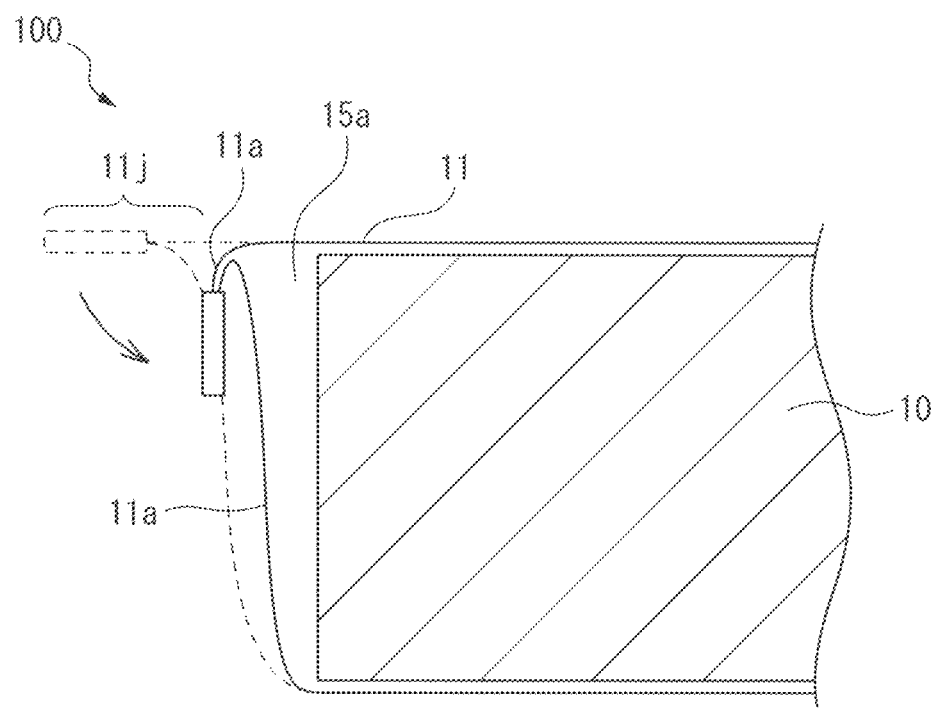
FIG. 1 is a cross-sectional schematic diagram showing one form of part of the all-solid-state battery of the disclosure.

Embodiments of the disclosure will now be explained in detail with reference to the accompanying drawings. In each diagram, for convenience of illustration, the same reference numerals are used for identical or corresponding parts, and their explanation will not be repeated. The constituent elements of the embodiments are not all necessarily essential, and some of the constituent elements may be omitted in some cases. However, the forms shown in the drawings are merely examples of the disclosure and are not intended to limit the disclosure.

<All-Solid-State Battery>

The all-solid-state battery of the disclosure is:

an all-solid-state battery comprising a battery stack with two or more unit cells, and an exterior film that seals the battery stack, wherein:

the unit cell is composed of a positive electrode collector layer, a positive electrode active material layer, a solid electrolyte layer, a negative electrode active material layer and a negative electrode collector layer, stacked in that order, the battery stack has a hexahedron shape formed by the top surface and bottom surface in the stacking direction, and first, second, third and fourth side walls, the first, second, third and fourth side walls being adjacent in that order, collector tabs of the battery stack protrude out from the first, second or third side wall, the exterior film is a single film covering the fourth side wall and sandwiching the battery stack from the top surface, and the bottom surface, the exterior film has:

first and second main side covering parts respectively covering the top surface and bottom surface of the battery stack, and mutually facing first, second and third perimeter edge parts respectively on the first, second and third side walls of the battery stack, first boundary parts between the first perimeter edge parts and the second perimeter edge parts, second boundary parts between the second perimeter edge parts and the third perimeter edge parts, a third boundary part between the third perimeter edge parts and the part covering the fourth side wall of the battery stack, and a fourth boundary part between the part covering the fourth side wall of the battery stack, and the first perimeter edge parts, with the collector tabs satisfying the following condition (i) when the collector tabs protrude from the first or third side wall, and the collector tabs satisfying the following condition (ii) when the collector tabs protrude from the second side wall:

condition (i)

the first boundary parts are folded from the boundary line between the first side wall and the second side wall along the first side wall, and between the facing first perimeter edge parts, the second boundary parts are folded from the boundary line between the second side wall and the third side wall along the third side wall, and between the facing third perimeter edge parts, the third boundary part is folded from the boundary line between the third side wall and the fourth side wall along the third side wall, and between the facing third perimeter edge parts, the fourth boundary part is folded from the boundary line between the fourth side wall and the first side wall along the first side wall, and between the facing first perimeter edge parts, the mutually facing first, second and third perimeter edge parts are joined together so that the battery stack is sealed by the exterior film, the collector tabs protrude out from between the mutually facing and mutually joined first or third perimeter edge parts, and the mutually joined second perimeter edge parts are folded along the first, second and third side walls.

condition (ii)

the first boundary parts are folded from the boundary line between the first side wall and the second side wall along the second side wall, and between the facing second perimeter edge parts, the second boundary parts are folded from the boundary line between the second side wall and the third side wall along the second side wall, and between the facing second perimeter edge parts, the third boundary part is folded from the boundary line between the third side wall and the fourth side wall along the third side wall, and between the facing third perimeter edge parts, the fourth boundary part is folded from the boundary line between the fourth side wall and the first side wall along the first side wall, and between the facing first perimeter edge parts, the mutually facing first, second and third perimeter edge parts are joined together so that the battery stack is sealed by the exterior film, the collector tabs protrude out from between the mutually facing and mutually joined second perimeter edge parts, and the mutually joined first and third perimeter edge parts are folded along the first and third side walls, respectively.

FIG. 1 is a cross-sectional schematic diagram showing one form of part of the all-solid-state battery of the disclosure.

The all-solid-state battery 100 of the disclosure in FIG. 1 comprises a battery stack 10 and an exterior film 11 that seals the battery stack 10. The exterior film 11 covers the top surface and the bottom surface of the battery stack 10 in the stacking direction. At one side wall of the battery stack 10, the facing perimeter edge parts 11*a* of the exterior film 11 are joined together at the joining site 11*j*. The mutually joined perimeter edge parts 11*a* are folded along the side wall of the battery stack 10. For convenience of illustration in FIG. 1, the two or more unit cells and collector tabs in the battery stack 10 are not shown in detail.

Figure 2:
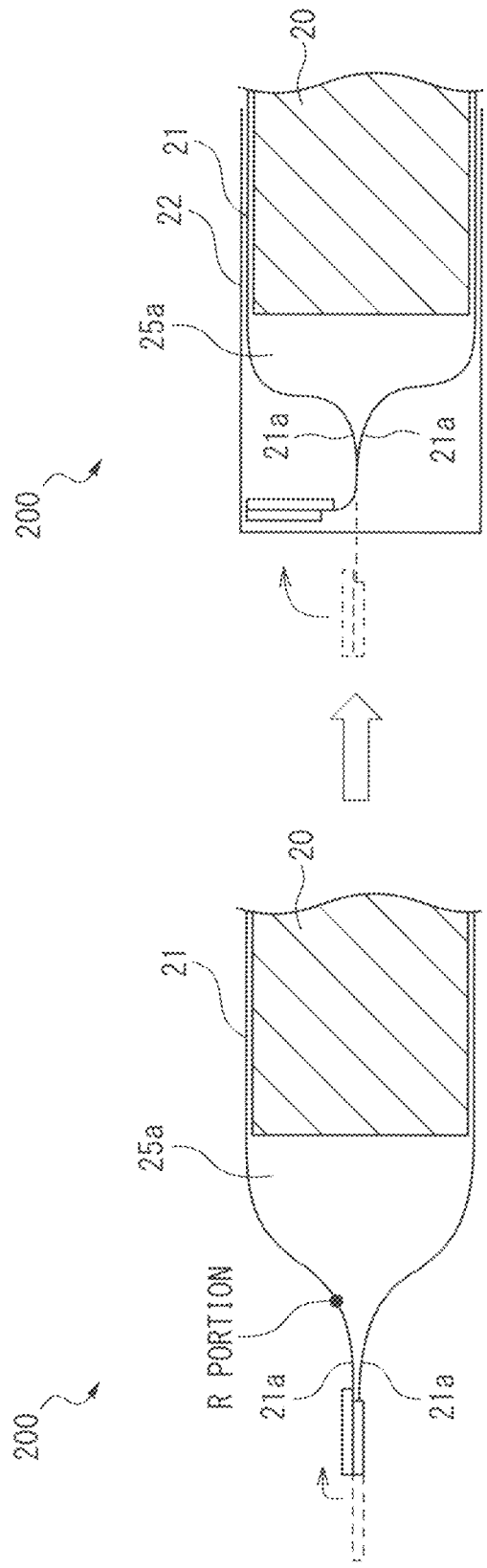
FIG. 2 is a schematic diagram showing conventional means for reducing bulk in an exterior material of a laminated battery.

In the all-solid-state battery 100 of the disclosure, as can be clearly seen in FIG. 1, the space 15*a* between the joined perimeter edge parts 11*a* and the side wall edge of the battery stack 10 is much smaller than the space 25*a* in a conventional laminated battery, such as the laminated battery 200 shown in FIG. 2. In addition, since the mutually joined perimeter edge parts 11*a* are folded along the side wall of the battery stack 10, the shape of the all-solid-state battery can be maintained.

In other words, the all-solid-state battery of the disclosure can increase the volumetric energy density while also maintaining the shape of the all-solid-state battery, compared to a conventional all-solid-state battery.

<Battery Stack>

The battery stack of the disclosure has two or more unit cells. The battery stack is a hexahedron shape formed by a top surface and bottom surface in the stacking direction, and first, second, third and fourth side walls, the first, second, third and fourth side walls being mutually adjacent in that order.

According to the disclosure, the "top surface and bottom surface in the stacking direction of the battery stack" are the two surfaces forming the outermost layer in the stacking direction of the battery stack, and they are in a perpendicular relationship with the stacking direction of the battery stack.

The "side walls of the battery stack" are the outer edge sides consisting of the planar direction edges of the positive electrode collector layer, positive electrode active material layer, solid electrolyte layer, negative electrode active material layer and negative electrode collector layer in the battery stack, and they are in a parallel relationship with the stacking direction of the battery stack.

The battery stack of the disclosure has a hexahedron shape formed by the top surface and bottom surface and the four side walls. Therefore, the side walls of the battery stack of the disclosure are four in total, and if one is defined as the "first side wall", then one of the side walls adjacent to it is the "second side wall", the side wall adjacent at the other end of the "second side wall" is the "third side wall", and finally the side wall adjacent to both the "third side wall" and the "first side wall" is the "fourth side wall".

Figure 3:
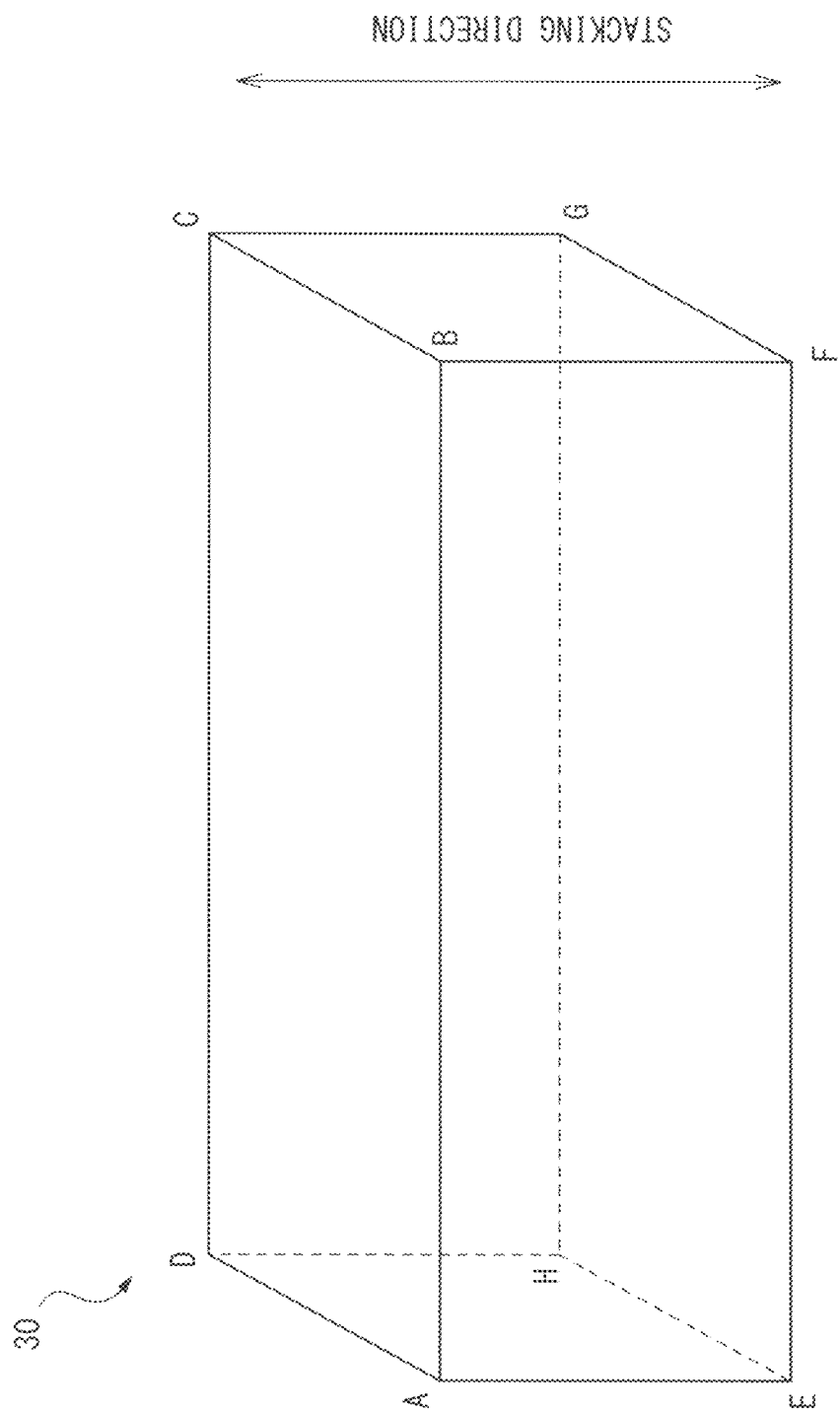
FIG. 3 is a 3d view illustrating one form of the battery stack of the disclosure.

FIG. 3 is a 3d view illustrating one form of the battery stack of the disclosure.

As shown in FIG. 3, the battery stack 30 of the disclosure has a hexahedron shape comprising, in the stacking direction, the top surface formed by ABCD, the bottom surface formed by EFGH, the first side wall formed by ADHE, the second side wall formed by ABFE, the third side wall formed by BCGF and the fourth side wall formed by DCGH. The first, second, third and fourth side walls are each adjacent in that order. For convenience of illustration in FIG. 3, the two or more unit cells in the battery stack 30 are not shown in detail. FIG. 3 also omits the collector tab of the battery stack protruding from the first side wall ADHE, second side wall ABFE or third side wall BCGF of the battery stack 30.

The battery stack of the disclosure is otherwise not particularly restricted so long as it has a hexahedron shape formed by the top surface and bottom surface in the stacking direction and the first, second, third and fourth side walls. For example, it may have a rectangular solid shape. As used herein, "rectangular solid shape" may be any shape that is nearly rectangular solid, optionally having irregularities in the surface or having curled edges. The term "rectangular solid shape" also includes "cuboid shape".

The sizes (areas) of the top surface and bottom surface of the battery stack of the disclosure may be the same or different. The sizes (areas) of the four side walls may also be the same or different.

From the viewpoint of easier management, the battery stack of the disclosure preferably has a rectangular solid shape and the areas of the top surface and bottom surface are larger than the areas of all of the first, second, third and fourth side walls.

According to the disclosure, the battery stack has two or more unit cells. The battery stack may be a monopolar type or a bipolar type composed of the two or more unit cells.

Figure 4:
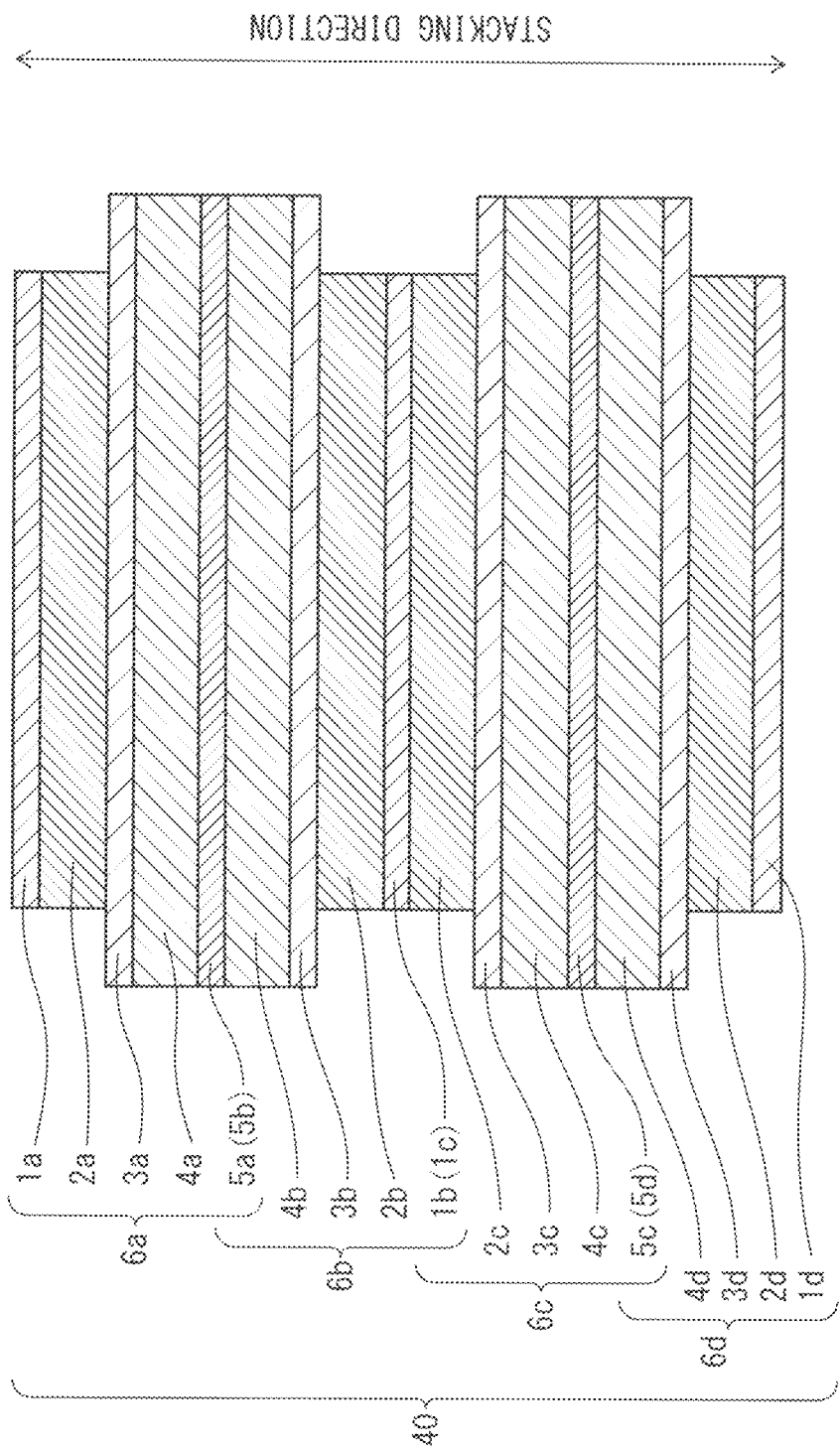
FIG. 4 is a simplified cross-sectional view showing one form of the battery stack of the disclosure having four unit cells.

FIG. 4, for example, is a simplified cross-sectional view showing one form of the battery stack of the disclosure having four unit cells. The battery stack 40 shown in FIG. 4 has four unit cells 6a, 6b, 6c and 6d. The monopolar battery stack 40 is constructed by combining the unit cells.

(Unit Cell)

According to the disclosure, a unit cell comprises a positive electrode collector layer, a positive electrode active material layer, a solid electrolyte layer, a negative electrode active material layer and a negative electrode collector layer, stacked in that order.

In the battery stack 40 shown in FIG. 4, for example, the unit cell 6a comprises a positive electrode collector layer 1a, a positive electrode active material layer 2a, a solid electrolyte layer 3a, a negative electrode active material layer 4a and a negative electrode collector layer 5a (5b), stacked in that order. The unit cell 6b comprises the negative electrode collector layer 5a (5b), a negative electrode active material layer 4b, a solid electrolyte layer 3b, a positive electrode active material layer 2b and a positive electrode collector layer 1b (1c), stacked in that order. The unit cell 6c comprises the positive electrode collector layer 1b (1c), a positive electrode active material layer 2c, a solid electrolyte layer 3c, a negative electrode active material layer 4c and a negative electrode collector layer 5c (5d), stacked in that order. The unit cell 6 comprises the negative electrode collector layer 5c (5d), a negative electrode active material layer 4d, a solid electrolyte layer 3d, a positive electrode active material layer 2d and a positive electrode collector layer 1d, stacked in that order.

According to the disclosure, the sizes (areas) of each of the layers in the unit cell are not particularly restricted and may be the same or different. In a stacked all-solid-state battery, which is typically a lithium ion battery, it is preferred for the solid electrolyte layer, negative electrode active material layer and negative electrode collector layer to be formed with larger areas than the positive electrode active material layer and the positive electrode collector layer, so that lithium ions released from the positive electrode active material layer during charge migrate reliably and smoothly to the negative electrode active material layer. The solid electrolyte layer, negative electrode active material layer and negative electrode collector layer therefore preferably have extending sections.

The members in a battery stack of a solid lithium ion secondary battery will be used for explanation in order to facilitate better understanding of the disclosure. It should be noted, however, that the all-solid-state battery of the disclosure has a wide range of application that is not limited only to a lithium ion secondary battery.

(Positive Electrode Collector Layer)

The conducting material used in the positive electrode collector layer is not particularly restricted, and any one that can be used in an all-solid-state battery may be employed as appropriate. For example, the conducting material used in the positive electrode collector layer may be, but is not limited to, stainless steel (SUS), aluminum, copper, nickel, iron, titanium or carbon.

The form of the positive electrode collector layer is not particularly restricted and may be, for example, a foil, sheet, mesh or the like. A foil is preferred among these.

(Positive Electrode Active Material Layer)

The positive electrode active material layer includes at least a positive electrode active material, and it preferably further includes the solid electrolyte described below. In addition, it may include additives used in positive electrode active material layers for all-solid-state batteries, such as conductive aids and binders, for example, depending on the application and the purpose of use.

The material of the positive electrode active material is not particularly restricted. Examples for the positive electrode active material include, but are not limited to, heterogenous element-substituted Li—Mn spinel having a composition represented by lithium cobaltate (LiCoO$_2$), lithium nickelate (LiNiO$_2$), lithium manganate (LiMn$_2$O$_4$), LiCo$_{1/3}$Ni$_{1/3}$Mn$_{1/3}$O$_2$ and Li$_{1+x}$Mn$_{2-x-y}$M$_y$O$_4$ (where M is one or more metal elements selected from among Al, Mg, Co, Fe, Ni and Zn).

The conductive aid is not particularly restricted. For example, the conductive aid may be, but is not limited to, a carbon material such as VGCF (Vapor Grown Carbon Fibers) or carbon nanofibers, or a metal material.

The binder is also not particularly restricted. For example, the binder may be, but is not limited to, a material such as polyvinylidene fluoride (PVdF), carboxymethyl cellulose (CMC), butadiene rubber (BR) or styrene-butadiene rubber (SBR), or a combination thereof.

(Solid Electrolyte Layer)

The solid electrolyte layer includes at least a solid electrolyte. The solid electrolyte used is not particularly restricted, and it may be any material that can be used as a solid electrolyte for an all-solid-state battery. For example, the solid electrolyte may be a sulfide solid electrolyte, an oxide solid electrolyte or a polymer electrolyte, although this is not limitative.

Examples for the sulfide solid electrolyte include, but are not limited to, sulfide-based amorphous solid electrolytes, sulfide-based crystalline solid electrolytes and argyrodite solid electrolytes. Specific examples of sulfide solid electrolytes include, but are not limited to, Li$_2$S—P$_2$S$_5$ (Li$_7$P$_3$S$_{11}$, Li$_3$PS$_4$, Li$_8$P$_2$S$_9$), Li$_2$S—SiS$_2$, LiI—Li$_2$S—P$_2$S$_5$, LiI—LiBr—Li$_2$S—P$_2$S$_5$, Li$_2$S—P$_2$S$_5$—GeS$_2$ (Li$_{13}$GeP$_3$S$_{16}$, Li$_{10}$GeP$_2$S$_{12}$), LiI—Li$_2$S—P$_2$O$_5$, LiI—Li$_3$PO$_4$—P$_2$S$_5$ and Li$_{7-x}$PS$_{6-x}$Cl$_x$, as well as combinations thereof.

Examples of oxide solid electrolytes include, but are not limited to, Li$_7$La$_3$Zr$_2$O$_{12}$, Li$_{7-x}$La$_3$Zr$_{1-x}$Nb$_x$O$_{12}$, Li$_{7-3x}$La$_3$Zr$_2$Al$_x$O$_{12}$, Li$_{3x}$La$_{2/3-x}$TiO$_3$, Li$_{1+x}$Al$_x$Ti$_{2-x}$(PO$_4$)$_3$, Li$_{1+x}$Al$_x$Ge$_{2-x}$(PO$_4$)$_3$, Li$_3$PO$_4$ and Li$_{3+x}$PO$_{4-x}$N$_x$(LiPON).

(Polymer Electrolyte)

Polymer electrolytes include, but are not limited to, polyethylene oxide (PEO) and polypropylene oxide (PPO), and their copolymers.

The solid electrolyte may be glass or crystallized glass (glass ceramic). The solid electrolyte layer may include a binder or the like if necessary, in addition to the solid electrolyte mentioned above. Specific examples are the same as for the "binder" mentioned above for the "positive electrode active material layer", and will not be mentioned again here.

(Negative Electrode Active Material Layer)

The negative electrode active material layer includes at least a negative electrode active material, and it preferably further includes the solid electrolyte described above. In addition, it may include additives used in negative electrode active material layers for all-solid-state batteries, such as conductive aids and binders, for example, depending on the application and the purpose of use.

The material for the negative electrode active material is not particularly restricted, but it is preferably one that is capable of occluding and releasing metal ions such as lithium ions. For example, the negative electrode active material may be, but is not limited to, alloy-based negative electrode active materials and carbon materials.

Alloy-based negative electrode active materials may include, but are not limited to, Si alloy-based negative electrode active materials and Sn alloy-based negative electrode active materials.

Si alloy-based negative electrode active materials include silicon, silicon oxides, silicon carbides, silicon nitrides, and their solid solutions. A Si alloy-based negative electrode active material may also include elements other than silicon, such as Fe, Co, Sb, Bi, Pb, Ni, Cu, Zn, Ge, In, Sn and Ti, for example.

Sn alloy-based negative electrode active materials include tin, tin oxides, tin nitrides, and their solid solutions. A Sn alloy-based negative electrode active material may also include elements other than tin, such as Fe, Co, Sb, Bi, Pb, Ni, Cu, Zn, Ge, In, Ti and Si, for example.

Among the aforementioned examples of alloy-based negative electrode active materials to be included in the negative electrode active material layer, the alloy-based negative electrode active material is preferably one including a Si alloy-based negative electrode active material.

Carbon materials are not particularly restricted and include hard carbon, soft carbon and graphite, for example.

The compounds mentioned above under "Positive electrode active material layer" and "Solid electrolyte layer" may be used as appropriate for solid electrolytes, conductive aids, binders and other additives in the negative electrode active material layer.

(Negative Electrode Collector Layer)

The conducting material used in the negative electrode collector layer is not particularly restricted, and any one that can be used in an all-solid-state battery may be employed as appropriate. For example, the conducting material used in the negative electrode collector layer may be, but is not limited to, SUS, aluminum, copper, nickel, iron, titanium or carbon.

The form of the negative electrode collector layer is not particularly restricted and may be, for example, a foil, sheet, mesh or the like. A foil is preferred among these.

(Collector Tabs)

According to the disclosure, the battery stack has collector tabs.

For example, a positive electrode collector tab electrically connected to the positive electrode collector layer and a negative electrode collector tab electrically connected to the negative electrode collector layer may each be provided.

The positive electrode collector layer may also have a positive electrode collector protrusion that protrudes in the in-plane direction, with the positive electrode collector tab being electrically connected to the positive electrode collector protrusion. Similarly, the negative electrode collector layer may also have a negative electrode collector protrusion, with the negative electrode collector tab being electrically connected to the negative electrode collector protrusion.

Such collector tabs of the battery stack protrude out from the first, second or third side wall of the battery stack, and protrude out from any one of the mutually joined first, second and third perimeter edge parts of the exterior film. This allows electric power generated by the battery stack to be externally extracted.

The battery stack in the all-solid-state battery of the disclosure may be constrained in the stacking direction. This will improve conductivity of ions and electrons within each layer and between each of the layers of the battery stack during charge-discharge, allowing the cell reaction to be further accelerated.

<Exterior Film>

According to the disclosure, an exterior film seals the battery stack.

The exterior film may be a resin-laminated metal foil having a resin film on one or both sides of a metal foil. For example, the exterior film of the disclosure may be an aluminum laminate film. An aluminum laminate film in this case includes a metal such as aluminum or an aluminum alloy. A typical example is a resin-laminated metal foil comprising a resin film laminated on one side of a metal foil in order to impart mechanical strength, and a resin film with a heat sealing property laminated on the opposite side.

The resin film serving to maintain mechanical strength may be a film made of polyester or nylon, for example. The resin film with a heat sealing property may be a film made of a polyolefin, for example, and specifically a polyethylene or polypropylene film.

The exterior film is a single film sandwiching the battery stack from the top surface and bottom surface of the battery stack, covering any side wall (such as the fourth side wall) of the battery stack.

The exterior film has:

first and second main side covering parts respectively covering the top surface and bottom surface of the battery stack, and mutually facing first, second and third perimeter edge parts respectively on the first, second and third side walls of the battery stack, first boundary parts between the first perimeter edge parts and the second perimeter edge parts, second boundary parts between the second perimeter edge parts and the third perimeter edge parts, a third boundary part between the third perimeter edge parts and the part covering the fourth side wall of the battery stack, and a fourth boundary part between the part covering the fourth side wall of the battery stack, and the first perimeter edge parts.

When the collector tabs protrude out from the first or third side wall of the battery stack, the all-solid-state battery of the disclosure will have the feature of satisfying condition (i), and when the collector tabs protrude out from the second side wall of the battery stack, the all-solid-state battery of the disclosure will have the feature of satisfying condition (ii). Exterior films satisfying each of these conditions will now be described in detail.

(Condition (i))

The first boundary parts are folded from the boundary line between the first side wall and the second side wall along the first side wall, and between the facing first perimeter edge parts, the second boundary parts are folded from the boundary line between the second side wall and the third side wall along the third side wall, and between the facing third perimeter edge parts, the third boundary part is folded from the boundary line between the third side wall and the fourth side wall along the third side wall, and between the facing third perimeter edge parts, the fourth boundary part is folded from the boundary line between the fourth side wall and the first side wall along the first side wall, and between the facing first perimeter edge parts, the mutually facing first, second and third perimeter edge parts are joined together so that the battery stack is sealed by the exterior film, the collector tabs protrude out from between the mutually facing and mutually joined first or third perimeter edge parts, and at least one of the mutually joined second perimeter edge parts are folded along the second side wall.

Figure 5:
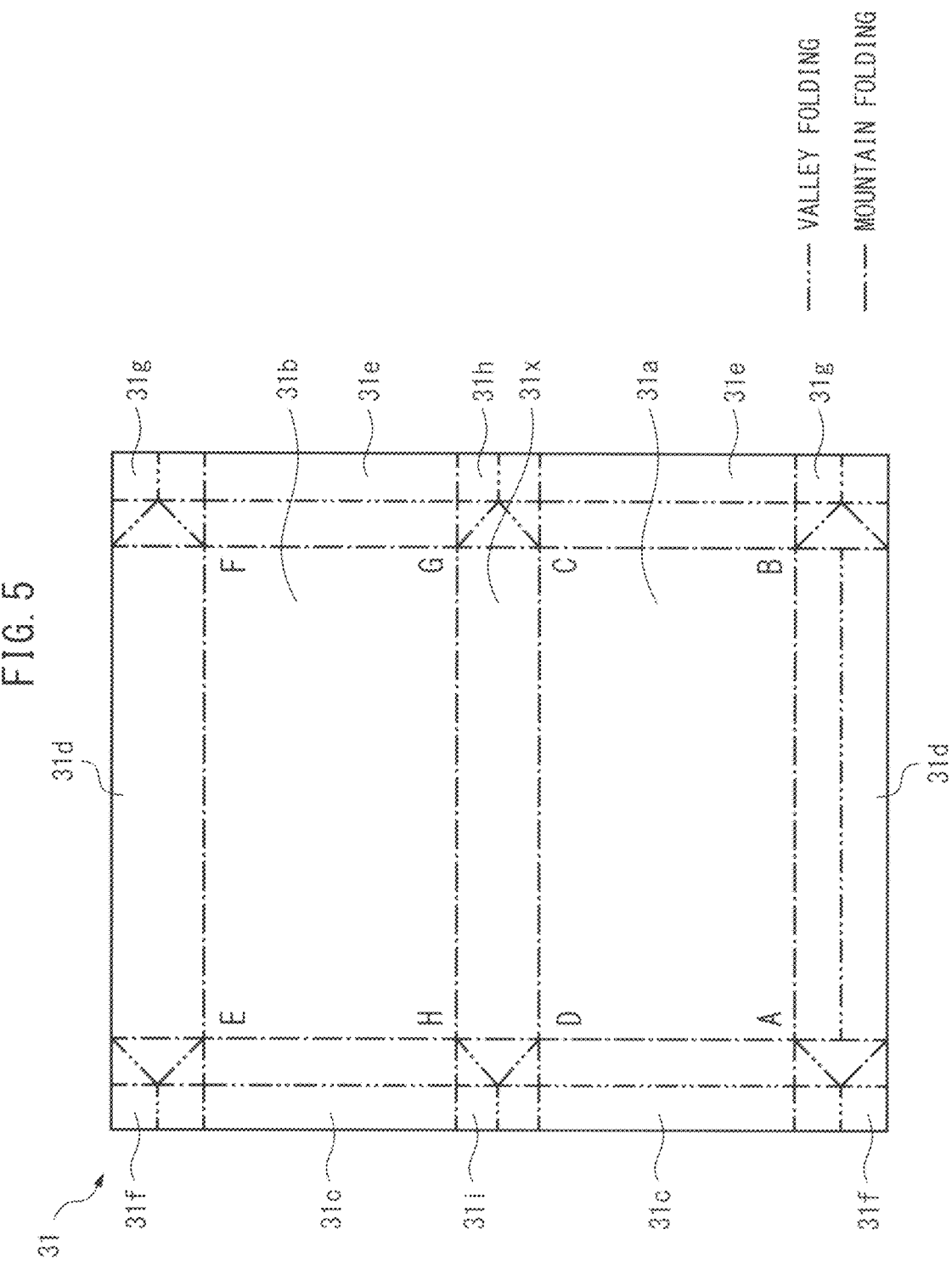
FIG. 5 is a planar schematic diagram showing one form of the exterior film of the disclosure.

FIG. 5 is a planar schematic diagram showing one form of the exterior film of the disclosure. This exterior film 31 is an example of an exterior film capable of covering the battery stack 30 shown in FIG. 3, in an expanded state. In FIG. 5, the dash-dot line represents mountain-folding and the two-dot-dash line represents valley folding.

As shown in FIG. 5, the exterior film 31 can cover the battery stack 30 from the top surface ABCD and bottom surface EFGH, covering the fourth side wall DCGH of the battery stack 30.

This exterior film 31 has:

a first main side covering part 31a and a second main side covering part 31b respectively covering the top surface ABCD and bottom surface EFGH of the battery stack 30, facing first perimeter edge parts 31c on the first side wall ADHE of the battery stack 30, facing second perimeter edge parts 31d on the second side wall ABFE of the battery stack 30, and facing third perimeter edge parts 31e on the third side wall BCGF of the battery stack 30, first boundary parts 31f between the first perimeter edge parts 31c and the second perimeter edge parts 31d, second boundary parts 31g between the second perimeter edge parts 31d and the third perimeter edge parts 31e, a third boundary part 31h between the third perimeter edge parts 31e and the part 31x covering the fourth side wall DCGH of the battery stack 30, and a fourth boundary part 31i between the part 31x covering the fourth side wall DCGH of the battery stack 30, and the first perimeter edge parts 31c.

According to the disclosure, since the sizes of each of the facing perimeter edge parts need only be sufficient sizes allowing them to be at least partially joined together, they may be either identical to each other, or different.

The first boundary parts 31f are folded between the facing first perimeter edge parts 31c, along the first side wall ADHE from the boundary line AE between the first side wall ADHE and the second side wall ABFE.

The second boundary parts 31g are folded between the facing third perimeter edge parts 31e, along the third side wall BCGF from the boundary line BF between the second side wall ABFE and the third side wall BCGF.

The third boundary part 31h is folded between the facing third perimeter edge parts 31e, along the third side wall BCGF from the boundary line CG between the third side wall BCGF and the fourth side wall DCGH.

The fourth boundary part 31i is folded between the facing first perimeter edge parts 31c, along the first side wall ADHE from the boundary line DH between the fourth side wall DCGH and the first side wall ADHE.

According to the disclosure, the form in which each of the boundary parts are folded between prescribed side walls and prescribed perimeter edge parts are not particularly restricted.

For example, as seen from the side walls of the battery stack, the boundary parts may be folded in between the perimeter edge parts of the exterior film along a prescribed side wall of the battery stack and on the side wall, in the form of a "gable top".

The facing first perimeter edge parts 31c, second perimeter edge parts 31d and third perimeter edge parts 31e are also mutually joined so that the battery stack 30 is sealed by the exterior film 31.

At least one of the mutually joined first perimeter edge parts 31c, second perimeter edge parts 31d and third perimeter edge parts 31e is folded along the first side wall ADHE, second side wall ABFE or third side wall BCGF of the battery stack 30.

Collector tabs (not shown) protrude out from between the mutually facing and mutually joined first perimeter edge parts 31c or third perimeter edge parts 31e, and the mutually joined second perimeter edge parts 31d are folded along the second side wall ABFE.

In addition, from the viewpoint of further increasing the volume energy of the all-solid-state battery, when the collector tabs are protruding from the first perimeter edge parts, the mutually joined third perimeter edge parts are preferably folded along the third side wall.

Similarly, from the viewpoint of further increasing the volume energy of the all-solid-state battery, when the collector tabs are protruding from the third perimeter edge parts, the mutually joined first perimeter edge parts are preferably folded along the first side wall.

The direction in which each of the perimeter edge parts are folded is not particularly restricted and may be the top surface direction or the bottom surface direction of the battery stack, along the stacking direction of the battery stack.

From the viewpoint of further increasing the volume energy of the all-solid-state battery, for the purpose of the disclosure it is preferred for the folding widths along the first, second and third side walls, at the perimeter edge parts among the mutually joined first, second and third perimeter edge parts that are folded along the first, second and third side walls, to be no greater than the thickness in the stacking direction of the battery stack.

From the viewpoint of further increasing the volume energy of the all-solid-state battery, the mutually joined first, second and third perimeter edge parts preferably do not protrude from the battery stack in the stacking direction of the battery stack.

According to the disclosure, at least one of the respective joining sites of the mutually joined first, second, third and fourth perimeter edge parts may extend from a location at the top surface or the bottom surface in the stacking direction of the battery stack.

For example, FIG. 1 shows a case where the joining site 11j of one of the mutually joined perimeter edge parts 11a extends from a location on the top surface, in the stacking direction of the battery stack 10. This joining site 11j is folded along the side wall of the battery stack 10 together with the mutually joined perimeter edge parts 11a.

Figure 6:
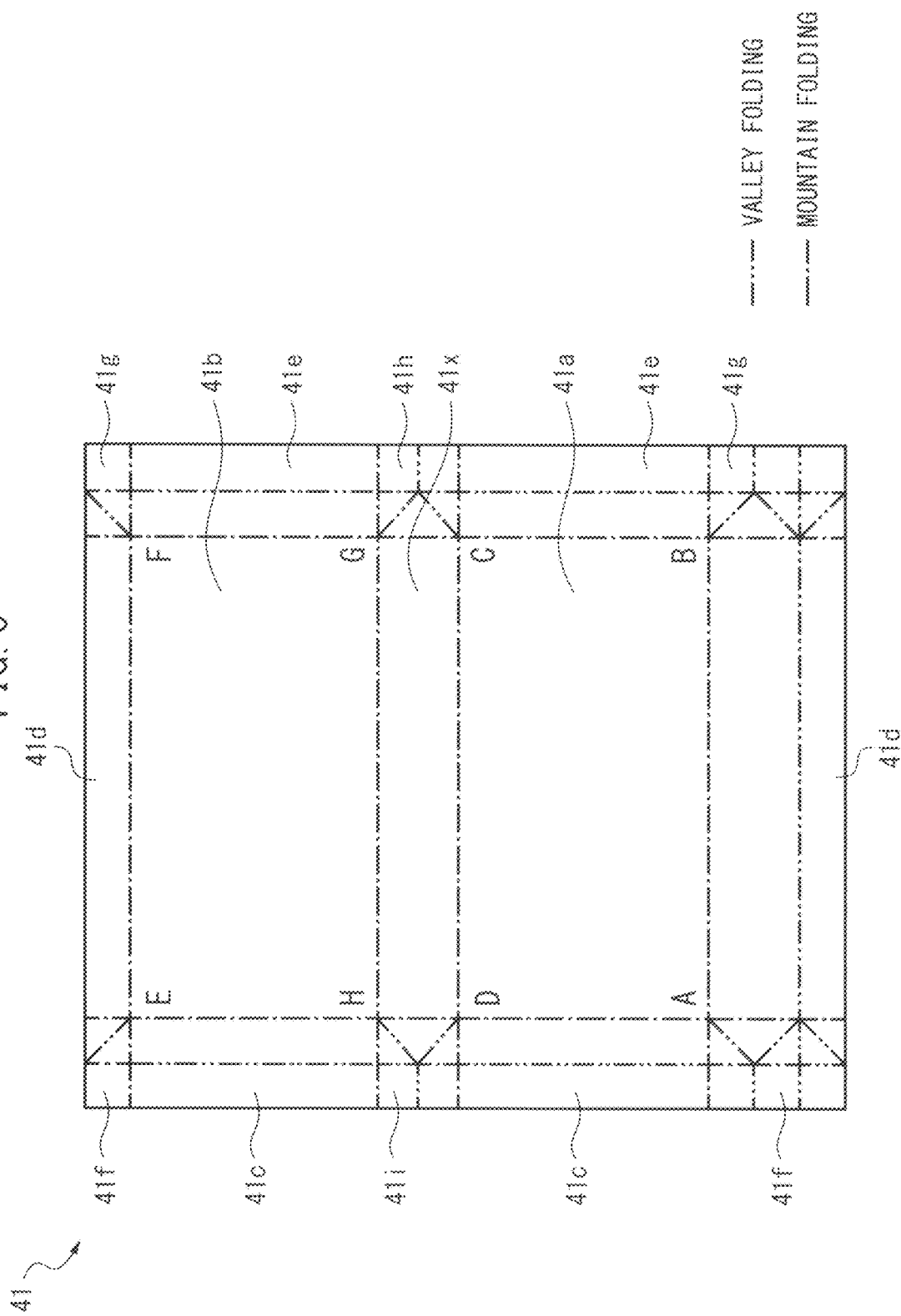
FIG. 6 is a planar schematic diagram showing one form of the exterior film of the disclosure.

FIG. 6 shows an expanded view of one case of an exterior film where at least one of the respective joining sites of the mutually joined first, second and third perimeter edge parts extends from a location at the top surface or the bottom surface in the stacking direction of the battery stack.

FIG. 6 is a planar schematic diagram showing one form of the exterior film of the disclosure. This exterior film 41 is an example of an exterior film capable of covering the battery stack 30 shown in FIG. 3, in an expanded state. In FIG. 6, the dash-dot lines represent mountain-folding and the two-dot-dash lines represent valley folding.

The expanded view of the exterior film 41 shown in FIG. 6 is the same as the exterior film 31 shown in FIG. 5 except for the location of the joining sites of the second perimeter edge parts, and it will not be explained again.

In the exterior film 41, as shown in FIG. 6, the joining sites of the mutually joined second perimeter edge parts 41d extend from the bottom surface location EFGH, in the stacking direction of the battery stack 31. In this case, the size of the second perimeter edge part 41d on the top surface ABCD side of the battery stack 31 is larger than the size of the second perimeter edge part 41d on the bottom surface EFGH side which is facing it, or in other words, they are sizes sufficient so that the second side wall ABFE of the battery stack 31 is covered.

According to the disclosure, at least one of the respective joining sites of the mutually joined first, second and third perimeter edge parts may extend from a location between the top surface and the bottom surface in the stacking direction of the battery stack.

Figure 7:
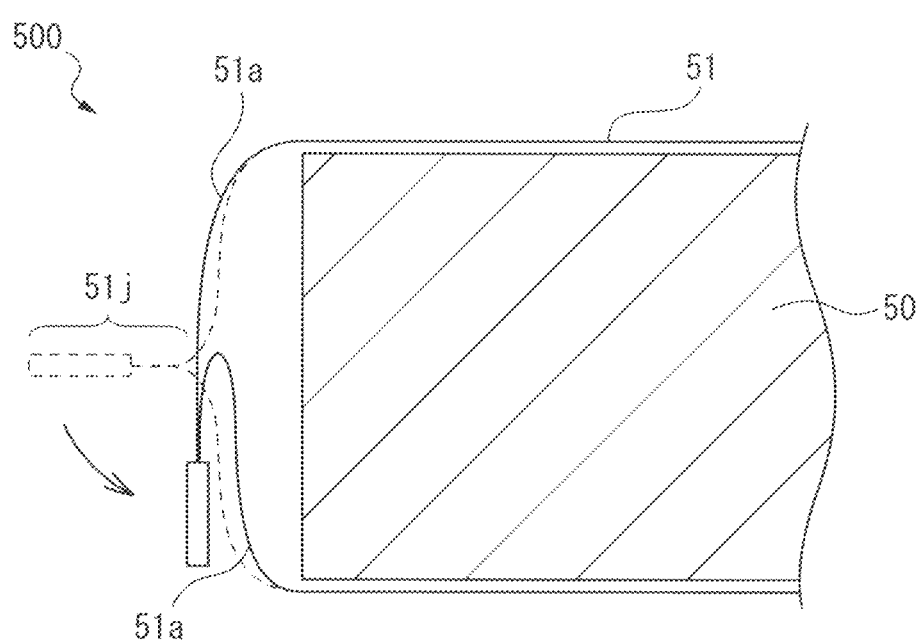
FIG. 7 is a cross-sectional schematic diagram showing one form of part of the all-solid-state battery of the disclosure.

FIG. 7 is a cross-sectional schematic diagram showing one form of part of the all-solid-state battery of the disclosure.

FIG. 7 shows a case where the joining site 51j of one of the mutually joined perimeter edge parts 51a extend from a location between the top surface and bottom surface in the stacking direction of the battery stack 50. This joining site 51j is folded along the side wall of the battery stack 50 together with the mutually joined perimeter edge parts 51a.

For reference, FIG. 5 shows an expanded view of one case of an exterior film where at least one of the respective joining sites of the mutually joined first, second and third perimeter edge parts extend from a location between the top surface and bottom surface in the stacking direction of the battery stack.

(Condition (ii))

The first boundary parts are folded from the boundary line between the first side wall and the second side wall along the second side wall, and between the facing second perimeter edge parts, the second boundary parts are folded from the boundary line between the second side wall and the third side wall along the second side wall, and between the facing second perimeter edge parts, the third boundary part is folded from the boundary line between the third side wall and the fourth side wall along the third side wall, and between the facing third perimeter edge parts, the fourth boundary part is folded from the boundary line between the fourth side wall and the first side wall along the first side wall, and between the facing first perimeter edge parts, the mutually facing first, second and third perimeter edge parts are joined together so that the battery stack is sealed by the exterior film, the collector tabs protrude out from between the mutually facing and mutually joined second perimeter edge parts, and the mutually joined first and third perimeter edge parts are folded along the first and third side walls, respectively.

Figure 8:
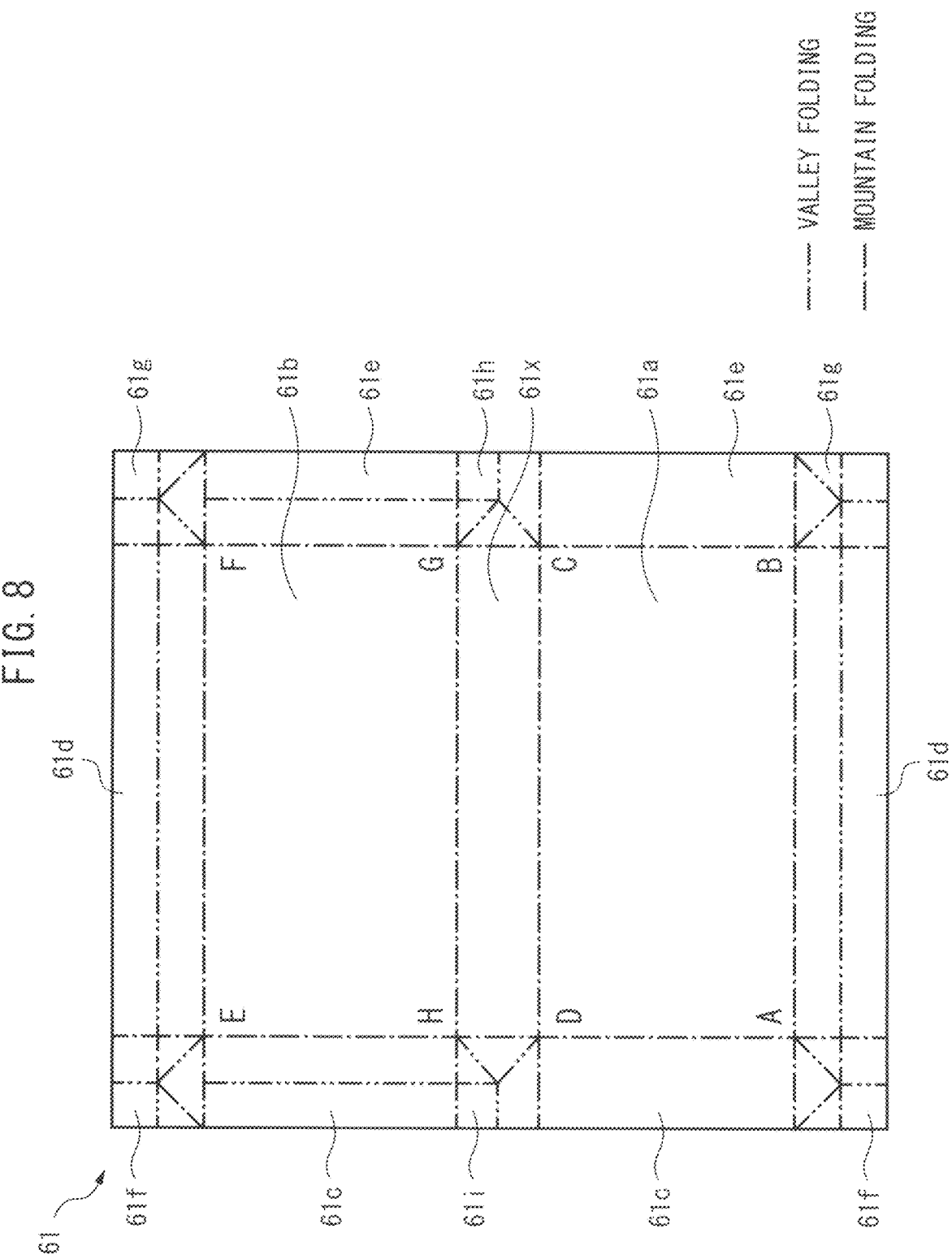
FIG. 8 is a planar schematic diagram showing one form of the exterior film of the disclosure.

FIG. 8 is a planar schematic diagram showing one form of the exterior film of the disclosure. This exterior film 61 is an example of an exterior film capable of covering the battery stack 30 shown in FIG. 3, in an expanded state. In FIG. 8, the dash-dot lines represent mountain-folding and the two-dot-dash lines represent valley folding.

As shown in FIG. 8, the exterior film 61 can cover the battery stack 30 from the top surface ABCD and bottom surface EFGH, covering the fourth side wall DCGH of the battery stack 30.

This exterior film 61 has:

a first main side covering part 61a and a second main side covering part 61b respectively covering the top surface ABCD and bottom surface EFGH of the battery stack 30, facing first perimeter edge parts 61c on the first side wall ADHE of the battery stack 30, facing second perimeter edge parts 61*d* on the second side wall ABFE of the battery stack 30, and facing third perimeter edge parts 61*e* on the third side wall BCGF of the battery stack 30, first boundary parts 61*f* between the first perimeter edge parts 61*c* and the second perimeter edge parts 61*d*, second boundary parts 61*g* between the second perimeter edge parts 61*d* and the third perimeter edge parts 61*e*, a third boundary part 61*h* between the third perimeter edge parts 61*e* and the part 61*x* covering the fourth side wall DCGH of the battery stack 30, and a fourth boundary part 61*i* between the part 61*x* covering the fourth side wall DCGH of the battery stack 30, and the first perimeter edge parts 31*c*.

The first boundary parts 61*f* are folded between the facing second perimeter edge parts 61*d*, along the second side wall ABFE from the boundary line AE between the first side wall ADHE and the second side wall ABFE.

The second boundary parts 61*g* are folded between the facing second perimeter edge parts 61*d*, along the second side wall ABFE from the boundary line BF between the second side wall ABFE and the third side wall BCGF.

The third boundary part 61*h* is folded between the facing third perimeter edge parts 61*e*, along the third side wall BCGF from the boundary line CG between the third side wall BCGF and the fourth side wall DCGH.

The fourth boundary part 61*i* is folded between the facing first perimeter edge parts 61*c*, along the first side wall ADHE from the boundary line DH between the fourth side wall DCGH and the first side wall ADHE.

The facing first perimeter edge parts 61*c*, second perimeter edge parts 61*d* and third perimeter edge parts 61*e* are also mutually joined so that the battery stack 30 is sealed by the exterior film 61.

Collector tabs (not shown) protrude out from between the mutually facing and mutually joined second perimeter edge parts 61*d*, and the mutually joined first perimeter edge parts 61*c* and third perimeter edge parts 61*e* are folded along the first side wall ADHE and third side wall BCGF, respectively.

<Method for Producing all-Solid-State Battery>

The present disclosure also provides a first method and a second method, as methods for producing the all-solid-state battery described above. More specifically, by the first method it is possible to produce an all-solid-state battery of the disclosure wherein the collector tabs protrude out from the first or third side wall. By the second method it is possible to produce an all-solid-state battery of the disclosure wherein the collector tabs protrude out from the second side wall.

Each method will now be described in detail with reference to the accompanying drawings, with the understanding that the disclosure is not limited to these modes. For each method, the parts in common with the all-solid-state battery described above and the parts in common with each other will not be described again.

<First Method>

With the first method it is possible to produce an all-solid-state battery of the disclosure wherein the collector tabs protrude out from the first or third side wall.

More specifically, the first method includes the following steps (a) to (e), as will be explained with reference to FIG. 5.

(Step (a))

In step (a), the battery stack 30 is sandwiched by the exterior film 31 from the top surface ABCD and bottom surface EFGH covering the fourth side wall DCGH, so that the first, second and third perimeter edge parts 31*c* to 31*e* of the exterior film 31 and the first and second boundary parts 31*f* and 31*g* are each mutually facing.

(Step (b))

In step (b), the facing second perimeter edge parts 31*d*, first boundary parts 31*f* and second boundary parts 31*g* are joined together.

(Step (c))

In step (c), the mutually joined second perimeter edge parts 31*d*, first boundary parts 31*f* and second boundary parts 31*g* are folded along the second side wall ABFE of the battery stack 30.

The direction of folding is not particularly restricted and may be along the stacking direction of the battery stack 30, with folding toward the direction of the top surface ABCD (as indicated by the dot and dash lines in FIG. 5, for example), or folding toward the direction of the bottom surface EFGH.

(Step (d))

In step (d), the following steps (d-1) to (d-4) are carried out either simultaneously or in an arbitrary order:

(d-1) folding the first boundary parts 31*f* of the exterior film 31 between the facing first perimeter edge parts 31*c*, along the first side wall ADHE from the boundary line AE between the first side wall ADHE and the second side wall ABFE, (d-2) folding the second boundary parts 31*g* of the exterior film 31 between the facing third perimeter edge parts 31*e*, along the third side wall BCGF from the boundary line BF between the second side wall ABFE and the third side wall BCGF, (d-3) folding the third boundary part 31*h* of the exterior film 31 between the facing third perimeter edge parts 31*e*, along the third side wall BCGF from the boundary line CG between the third side wall BCGF and the fourth side wall DCGH, and (d-4) folding the fourth boundary part 31*i* of the exterior film 31 between the facing first perimeter edge parts 31*c*, along the first side wall ADHE from the boundary line DH between the fourth side wall DCGH and the first side wall ADHE.

(Step (e))

In step (e), the facing first or third perimeter edge parts 31*c* or 31*e* are joined together with the boundary parts 31*f*, 31*i*, 31*g*, 31*h*, respectively folded between them, with the collector tabs protruding from between the facing first or third perimeter edge parts 31*c* or 31*e*.

<Second Method>

By the second method it is possible to produce an all-solid-state battery of the disclosure wherein the collector tabs protrude out from the second side wall.

More specifically, the second method (FIG. 8) includes the following steps (a) to (f).

(Step (a))

In step (a), the battery stack 30 is sandwiched by the exterior film 61 from the top surface ABCD and bottom surface EFGH covering the fourth side wall DCGH, so that the first, second and third perimeter edge parts 61*c* to 61*e* of the exterior film 61 and the first and second boundary parts 61*f* and 61*g* are each mutually facing.

(Step (b))

In step (b), the following steps (b-1) and (b-2) are carried out either simultaneously or in an arbitrary order:

(b-1) folding the third boundary part 61*h* of the exterior film 61 between the facing third perimeter edge parts 61*e*, along the third side wall BCGF from the boundary line CG between the third side wall BCGF and the fourth side wall DCGH, and (b-2) folding the fourth boundary part 61*i* of the exterior film 61 between the facing first perimeter edge parts 61*c*, along the first side wall ADHE from the boundary line DH between the fourth side wall DCGH and the first side wall ADHE.

(Step (c))

In step (c), the facing first perimeter edge parts 61*c* and the fourth boundary 61*i* folded between them, the facing third perimeter edge parts 61*e* and the third boundary part 61*h* folded between them, and the facing first and second boundary parts 61*f* and 61*g* are joined together.

(Step (d))

In step (d), the following steps (d-1) and (d-2) are carried out either simultaneously or in an arbitrary order:

(d-1) folding the mutually joined first perimeter edge parts 61*c*, the mutually joined first boundary parts 61*f* and the fourth boundary part 61*i* folded between the facing first perimeter edge parts 61*c*, along the first side wall ADHE of the battery stack 30, and (d-2) folding the mutually joined third perimeter edge parts 61*e*, the mutually joined second boundary 61*g* and the third boundary part 61*h* folded between the facing third perimeter edge parts 61*e*, along the third side wall BCGF of the battery stack 30.

(Step (e))

In step (e), the following steps (e-1) and (e-2) are carried out either simultaneously or in an arbitrary order:

(e-1) folding the first boundary parts 61*f* of the exterior film 61 between the facing second perimeter edge parts 61*d*, along the second side wall ABFE from the boundary line AE between the first side wall ADHE and the second side wall ABFE, and (e-2) folding the second boundary parts 61*g* of the exterior film 61 between the facing second perimeter edge parts 61*d*, along the second side wall ABFE from the boundary line BF between the second side wall ABFE and the third side wall BCGF.

(Step (f))

(f) Joining together the facing second perimeter edge parts 61*d* together with the boundary parts 61*g* and 61*g* respectively folded between them, with the collector tabs protruding from between the facing second perimeter edge parts 61*d*.

In the first and second methods, the method of folding the boundary parts between the facing perimeter edge parts along the side walls is not particularly restricted, and it may be a method of forming a "gable top", for example.

Moreover, in the first and second methods, the direction during folding of the perimeter edge parts along the side walls of the battery stack is not particularly restricted, and it may be along the top surface of the battery stack or along the bottom surface of the battery stack.

Furthermore, in the first and second methods, the method of sealing the exterior film is not particularly restricted and may be a method of sealing with an adhesive or sealing by heat, for example.

EXAMPLES

Example 1

An exterior film of the same type as the exterior film 31 shown in FIG. 5 was used, and the battery stack was sealed to fabricate an all-solid-state battery for Example 1.

Figure 9:
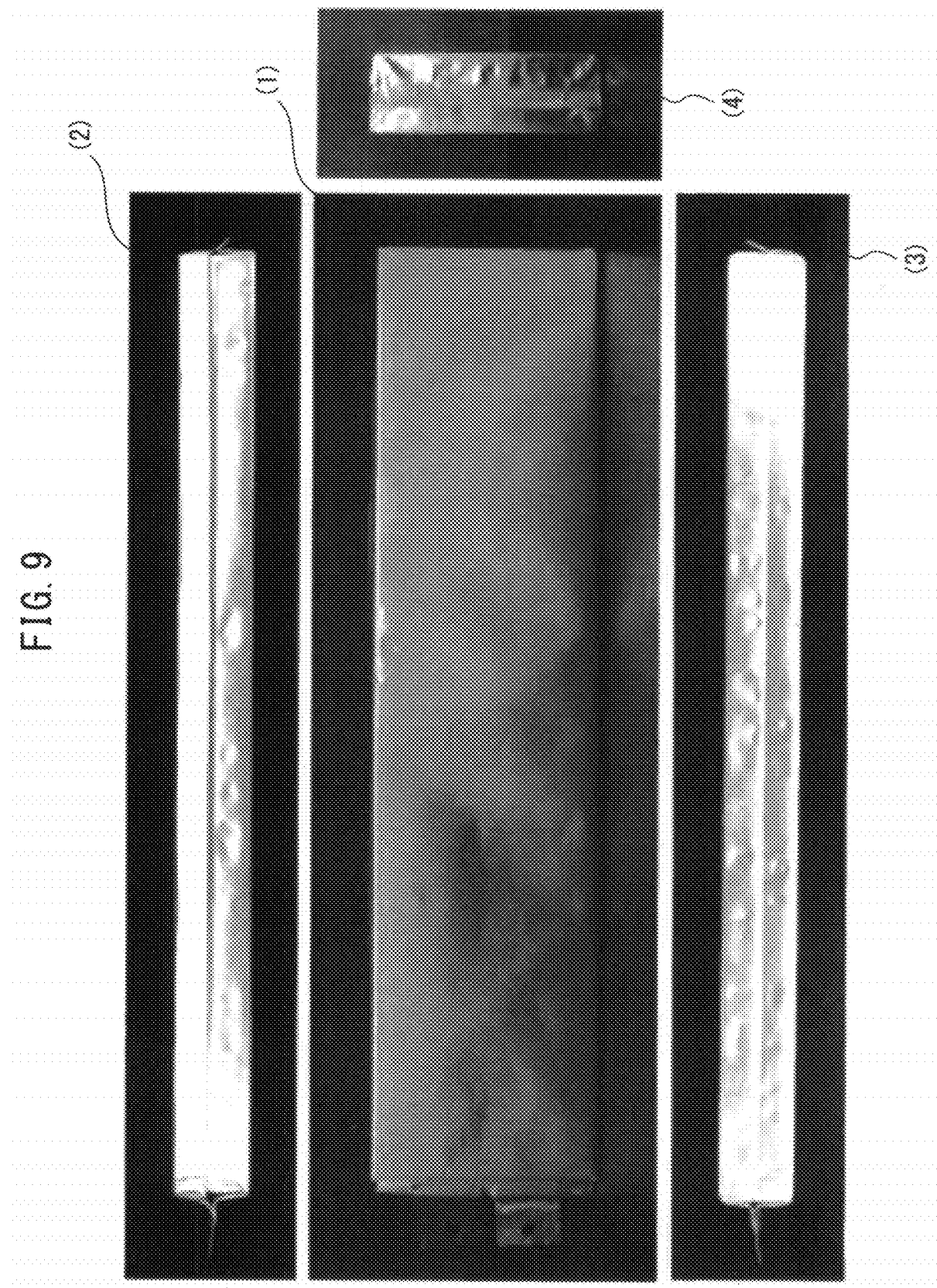
FIG. 9 is a photograph taken of the all-solid-state battery of Example 1.

FIG. 9 shows a photograph taken of the fabricated all-solid-state battery of Example 1. In FIG. 9, (1) is a photograph taken from the top surface of the all-solid-state battery, and (2) to (4) are photographs taken from different sides.

Example 2

An exterior film of the same type as the exterior film 41 shown in FIG. 6 was used, and the battery stack was sealed to fabricate an all-solid-state battery for Example 2.

Figure 10:
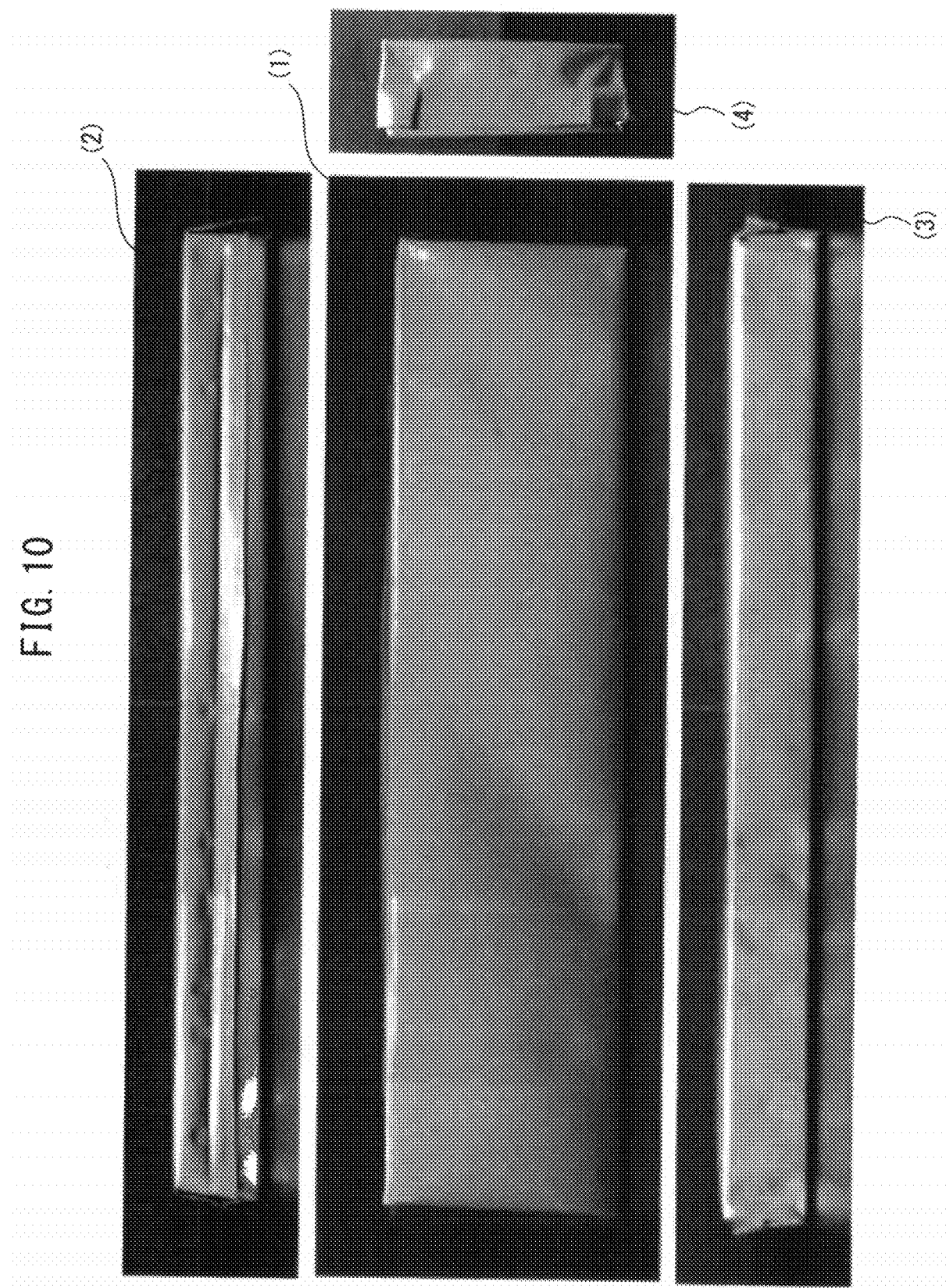
FIG. 10 is a photograph taken of the all-solid-state battery of Example 2.

FIG. 10 shows a photograph taken of the fabricated all-solid-state battery of Example 2. In FIG. 10, (1) is a photograph taken from the top surface of the all-solid-state battery, and (2) to (4) are photographs taken from different sides.

REFERENCE SIGNS LIST 10, 20, 30, 50 Battery stack
21 Aluminum laminate
31, 41, 51, 61, Exterior film
15*a*, 25*a* Space between perimeter edge parts and side wall edge of battery stack
100, 500 All-solid-state battery
200 Prior art laminated battery

What is claimed is:

1. An all-solid-state battery comprising a battery stack with two or more unit cells, and an exterior film that seals the battery stack, wherein:

each unit cell is composed of a positive electrode collector layer, a positive electrode active material layer, a solid electrolyte layer, a negative electrode active material layer and a negative electrode collector layer, stacked in that order, the battery stack has a hexahedron shape formed by a top surface and bottom surface in the stacking direction, and first, second, third and fourth side walls, the first, second, third and fourth side walls being adjacent in that order, collector tabs of the battery stack protrude out from the first, second or third side wall, the exterior film is a single film covering the fourth side wall and sandwiching the battery stack from the top surface and bottom surface, the exterior film has:

first and second main side covering parts respectively covering the top surface and bottom surface of the battery stack, and mutually facing first, second and third perimeter edge parts respectively on the first, second and third side walls of the battery stack, first boundary parts between the first perimeter edge parts and the second perimeter edge parts, second boundary parts between the second perimeter edge parts and the third perimeter edge parts, a third boundary part between the third perimeter edge parts and the part covering the fourth side wall of the battery stack, and a fourth boundary part between the part covering the fourth side wall of the battery stack, and the first perimeter edge parts, with the collector tabs satisfying the following condition (i) when the collector tabs protrude from the first or third side wall, and the collector tabs satisfying the following condition (ii) when the collector tabs protrude from the second side wall:

condition (i)
- the first boundary parts are folded from the boundary line between the first side wall and the second side wall along the first side wall, and between the facing first perimeter edge parts,
- the second boundary parts are folded from the boundary line between the second side wall and the third side wall along the third side wall, and between the facing third perimeter edge parts,
- the third boundary part is folded from the boundary line between the third side wall and the fourth side wall along the third side wall, and between the facing third perimeter edge parts,
- the fourth boundary part is folded from the boundary line between the fourth side wall and the first side wall along the first side wall, and between the facing first perimeter edge parts,
- the facing first, second and third perimeter edge parts are joined together so that the battery stack is sealed by the exterior film,
- the collector tabs protrude out from between the mutually facing and mutually joined first or third perimeter edge parts, and
- the mutually joined second perimeter edge parts are folded along the second side wall;

condition (ii)
- the first boundary parts are folded from the boundary line between the first side wall and the second side wall along the second side wall, and between the facing second perimeter edge parts,
- the second boundary parts are folded from the boundary line between the second side wall and the third side wall along the second side wall, and between the facing second perimeter edge parts,
- the third boundary part is folded from the boundary line between the third side wall and the fourth side wall along the third side wall, and between the facing third perimeter edge parts,
- the fourth boundary part is folded from the boundary line between the fourth side wall and the first side wall along the first side wall, and between the facing first perimeter edge parts,
- the facing first, second and third perimeter edge parts are joined together so that the battery stack is sealed by the exterior film,
- the collector tabs protrude out from between the mutually facing and mutually joined second perimeter edge parts, and
- the mutually joined first and third perimeter edge parts are folded along the first and third side walls, respectively.

2. The all-solid-state battery according to claim 1, wherein for condition (i),
- when the collector tabs protrude from the first perimeter edge parts, the mutually joined third perimeter edge parts are folded along the third side wall, and
- when the collector tabs protrude from the third perimeter edge parts, the mutually joined first perimeter edge parts are folded along the first side wall.

3. The all-solid-state battery according to claim 1, wherein at the perimeter edge parts among the mutually joined first, second and third perimeter edge parts that are folded along the first, second and third side walls, the folding widths along the first, second and third side walls are no greater than the thickness in the stacking direction of the battery stack.

4. The all-solid-state battery according to claim 1, wherein the mutually joined first, second and third perimeter edge parts do not protrude outward from the battery stack in the stacking direction of the battery stack.

5. The all-solid-state battery according to claim 1, wherein at least one of the respective joining sites of the mutually joined first, second and third perimeter edge parts extends from a location between the top surface and bottom surface in the stacking direction of the battery stack.

6. The all-solid-state battery according to claim 1, wherein at least one of the respective joining sites of the mutually joined first, second, third and fourth perimeter edge parts extends from a location at the top surface or the bottom surface in the stacking direction of the battery stack.

7. The all-solid-state battery according to claim 1, wherein the battery stack has a rectangular solid shape, and the respective areas of the top surface and bottom surface are larger than the areas of all of the first, second, third and fourth side walls.

8. The all-solid-state battery according to claim 1, wherein the exterior film is an aluminum laminate film.

9. A method for producing the all-solid-state battery according to claim 1 in which the collector tabs protrude from the first or third side wall, the method including the following steps:
- (a) sandwiching the battery stack by the exterior film from the top surface and bottom surface, and covering the fourth side wall, so that the first, second and third perimeter edge parts of the exterior film and the first and second boundary parts are each mutually facing;
- (b) joining together the facing second perimeter edge parts, first boundary parts and second boundary parts;
- (c) folding the mutually joined second perimeter edge parts, first boundary parts and second boundary parts along the second side wall of the battery stack;
- (d) carrying out the following steps (d-1) to (d-4) either simultaneously or in an arbitrary order:
- (d-1) folding the first boundary parts of the exterior film from the boundary line between the first side wall and the second side wall, along the first side wall and between the facing first perimeter edge parts,
- (d-2) folding the second boundary parts of the exterior film from the boundary line between the second side wall and the third side wall, along the third side wall and between the facing third perimeter edge parts,
- (d-3) folding the third boundary part of the exterior film from the boundary line between the third side wall and the fourth side wall, along the third side wall and between the facing third perimeter edge parts, and
- (d-4) folding the fourth boundary part of the exterior film from the boundary line between the fourth side wall and the first side wall, along the first side wall and between the facing first perimeter edge parts; and
- (e) joining together the facing first or third perimeter edge parts together with the boundary parts respectively folded between them, with the collector tabs protruding from between the facing first or third perimeter edge parts.

10. A method for producing the all-solid-state battery according claim 1 in which the collector tabs protrude from the second side wall, the method including the following steps:
- (a) sandwiching the battery stack by the exterior film from the top surface and bottom surface, and covering the fourth side wall, so that the first, second and third perimeter edge parts of the exterior film and the first and second boundary parts are each mutually facing;
- (b) carrying out the following steps (b-1) and (b-2) either simultaneously or in an arbitrary order:

(b-1) folding the third boundary part of the exterior film from the boundary line between the third side wall and the fourth side wall, along the third side wall and between the facing third perimeter edge parts, and (b-2) folding the fourth boundary part of the exterior film from the boundary line between the fourth side wall and the first side wall, along the first side wall and between the facing first perimeter edge parts;

(c) joining together the facing first perimeter edge parts and the fourth boundary part folded between them, the facing third perimeter edge parts and the third boundary part folded between them, and the facing first and second boundary parts;

(d) carrying out the following steps (d-1) and (d-2) either simultaneously or in an arbitrary order:

(d-1) folding the mutually joined first perimeter edge parts, the mutually joined first boundary parts and the fourth boundary part folded between the facing first perimeter edge parts, along the first side wall of the battery stack, and (d-2) folding the mutually joined third perimeter edge parts, the mutually joined second boundary parts and the third boundary part folded between the facing third perimeter edge parts, along the third side wall of the battery stack;

(e) carrying out the following steps (e-1) and (e-2) either simultaneously or in an arbitrary order:

(e-1) folding the first boundary parts of the exterior film from the boundary line between the first side wall and the second side wall, along the second side wall and between the facing second perimeter edge parts, and (e-2) folding the second boundary parts of the exterior film from the boundary line between the third side wall and the third side wall, along the second side wall and between the facing second perimeter edge parts; and (f) joining together the facing second perimeter edge parts together with the boundary parts respectively folded between them, with the collector tabs protruding from between the facing second perimeter edge parts.

* * * * *